United States Patent [19]

Schindl

[11] Patent Number: 4,572,624

[45] Date of Patent: Feb. 25, 1986

[54] DRAFTING AND MACROPHOTOGRAPHY ATTACHMENT FOR A MICROSCOPE OF THE INVERTED TYPE

[75] Inventor: Klaus Schindl, Vienna, Austria

[73] Assignee: C. Reichert Optische Werke, AG, Vienna, Austria

[21] Appl. No.: 511,435

[22] Filed: Jul. 6, 1983

[30] Foreign Application Priority Data

Jul. 7, 1982 [DE] Fed. Rep. of Germany ....... 3225353

[51] Int. Cl.4 .................. G02B 21/36; G02B 27/10
[52] U.S. Cl. .................................. 350/502; 350/507; 350/572; 350/174; 356/394
[58] Field of Search ............. 350/174, 502, 507, 508, 350/511, 572, 515, 297, 299; 356/394, 397, 254, 255; 354/79

[56] References Cited

U.S. PATENT DOCUMENTS

| 3,565,534 | 2/1971 | Chaban | 356/394 |
| 4,057,318 | 11/1977 | Schindl | 350/502 |
| 4,302,087 | 11/1981 | Reinheimer et al. | 350/502 |
| 4,303,340 | 1/1981 | Hoffman | 350/508 |

Primary Examiner—Jon W. Henry
Attorney, Agent, or Firm—Alan H. Spencer; Stephen Raines; Gary M. Nath

[57] ABSTRACT

A drafting apparatus, or macrophotography attachment, for a microscope of the inverted type, the apparatus being arranged to provide an erect and laterally non-reversed image of an object on a drawing-surface, and in the observation plane, or an erect and laterally non-reversed image of a drawing or object at the observation and film planes of a microscope.

7 Claims, 2 Drawing Figures

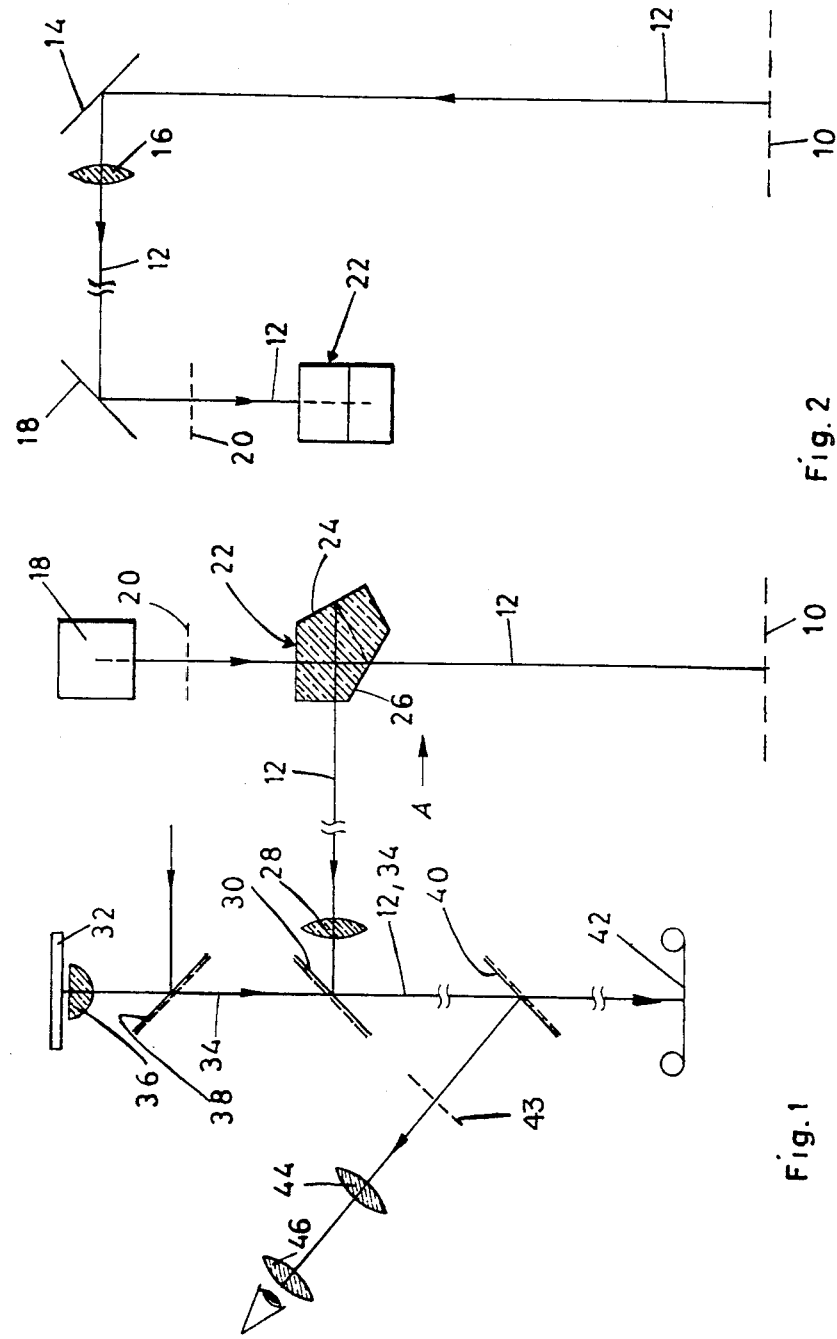

DRAFTING AND MACROPHOTOGRAPHY ATTACHMENT FOR A MICROSCOPE OF THE INVERTED TYPE

BACKGROUND OF THE INVENTION

This invention relates to a drafting apparatus, or a macrophotography attachment, for a microscope of the inverted type, and more particularly concerns such an attachment for a microscope possessing a deflecting device which enables the image to be viewed, and which deflects the downward-directed microscope object beam laterally and upwards to the eyepiece.

Drafting apparatus, or macrophotography attachments, for use with upright microscopes are known. In such apparatus, light is directed upwards from a horizontal surface comprising or bearing a drawing surface, or a horizontally-lying macro-object. The light beam is laterally deflected by a first deflecting device comprising a single reflecting surface, and is deflected upwards, into the eyepiece, by a semi-transparent surface for reflecting images, this surface being located between the microscope objective and the eyepiece.

The surface for reflecting images is parallel with the reflecting surface of the first deflecting device, and thus their reflections cancel out. Furthermore, an intermediate image is produced on the path from the horizontal surface to the surface at which images are reflected, while no intermediate image is present in the microscope, apart from the image which is formed in the eyepiece plane. Consequently, the image of the drawing surface appears upright and laterally non-reversed in the viewing eyepiece, thus facilitating drawing on the horizontal surface.

Such an apparatus system cannot be used with microscopes of the inverted type.

OBJECT OF THE PRESENT INVENTION

An object of the present invention is to provide a drafting apparatus, or macrophotography attachment, which can be used on a microscope of the inverted type.

BRIEF DESCRIPTION OF THE INVENTION

According to the present invention, we provide drafting apparatus, or macrophotography attachment, for a microscope of the inverted type, the microscope being provided with a deflecting device which deflects the downward-directed microscope object beam laterally and upwardly to the eyepiece, and which also causes the image to be reflected, characterized by a surface for reflecting images, between the microscope objective and the deflecting device, said surface serving to reflect the drawing surface, or the macro-object, into the microscope object beam by a first deflecting device which laterally deflects the upward-directed beam from the horizontal drawing surface, or from the horizontally-lying macro-object, in a plane which is parallel with the plane in which the microscope object beam is deflected, by a second deflecting device which deflects the beam, deflected by the first deflecting device, downwards, and by a third deflecting device which deflects the beam, deflected by the second deflecting device, at right angles to the beam between the first and second deflecting devices and towards the surface for reflecting images, one of the three deflecting devices possessing two reflecting surfaces which produce an inverstion of the image, while each of the other two deflecting devices possesses only a single reflecting surface, or an odd number of reflecting surfaces, arrangements being made to form a single intermediate image of the macro-object, or of the drawing surface, between the drawing surface, or the macro-object, and the surface for reflecting images, the first and second deflecting devices and the observation plane being situated on the same side of the plane containing said surface of reflecting images, the third deflecting device and the second deflecting device. In this manner, it is thus possible to ensure that the image of the drawing surface, or of the macro-object, is reproduced upright and laterally non-reversed in the viewing eyepieces of the microscope.

The deflecting device which produces an inversion of the image is preferably a pentagonal prism with two reflecting surfaces.

It is preferred, furthermore, that the deflecting devices, with the exception of the deflecting device which enables the image to be viewed, but including the surface for reflecting images, in each case ensure that the beam is deflected through 90°.

In a particular embodiment of the invention, arrangements are made where a single intermediate image of the microscopic object is formed between the observation plane and the microscope objective to furnish the third deflecting device with two reflecting surfaces which produce an inversion of the image, while in the case of a microscope of the inverted type, in which no intermediate image is formed between the observation plane and the microscope objective, it is necessary to furnish the first or second deflecting device with two reflecting surfaces, which produce an inversion of the image.

BRIEF DESCRIPTION OF THE DRAWINGS

Further advantages, details, and features of the invention will be apparent from the following description of one embodiment of the invention, reference being made to the drawing in which:

FIG. 1 is a diagrammatic representation of an embodiment of the invention; and

FIG. 2 is a diagrammatic representation of the direction A of a portion of the embodiment shown in FIG. 1.

DESCRIPTION OF THE PREFERRED EMBODIMENT

Figure 4:
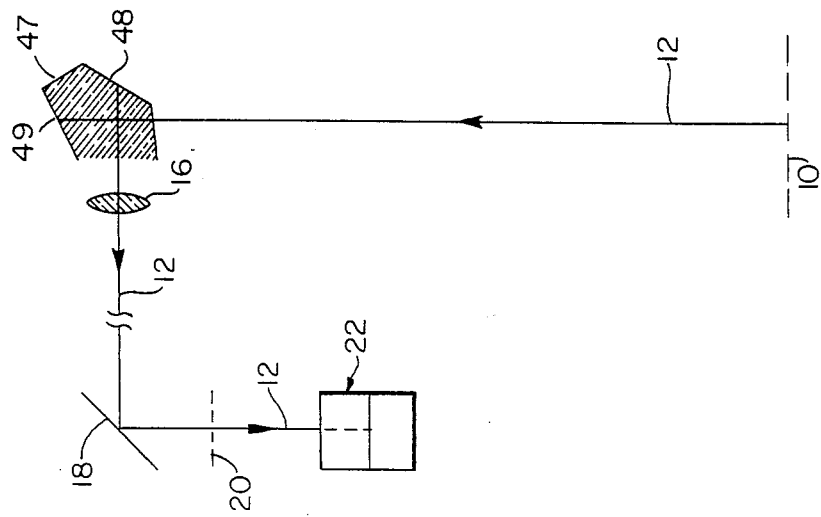
FIG. 4 is a diagrammatic representation of the direction A of a portion of the embodiment shown in FIG. 3.

A drawing surface is marked 10. The upward-directed macro-object beam, from the drawing surface, bears the reference number 12. The upward-directed macro-object beam 12 is laterally deflected, through 90°, by a first deflecting device 14, in the form of a single opaque reflecting surface, passes through a lens 16 and then strikes a second deflecting device 18, in the form of a single opaque reflecting surface, there the object beam 12 is once again deflected through 90°, in the downward direction. The reflecting surfaces of the deflecting devices 14 and 18 are both located at right angles to the plane of the path of the macro-object beam 12. The lens 16 forms an intermediate image 20 of the drawing surface 10 or, as the case may be, of the macro-object, lying between the second deflecting device 18 and a third deflecting device 22.

The third deflecting device 22 is a pentagonal prism with two reflecting surfaces, 24 and 26, which produce an inversion of the image, the pentagonal prism 22 being arranged, as shown, in a manner such that the beam, which is directed downwards by the second deflecting device 18, is deflected off, through 90°, in a plane at right angles to the plane of the path of the beam from the drawing surface 10, up to the third deflecting device 22. In the alternative the intermediate image 42, can be dispensed with, and the first or second deflecting device provided with two reflecting surfaces thereby producing an inversion of the image.

Figure 3:
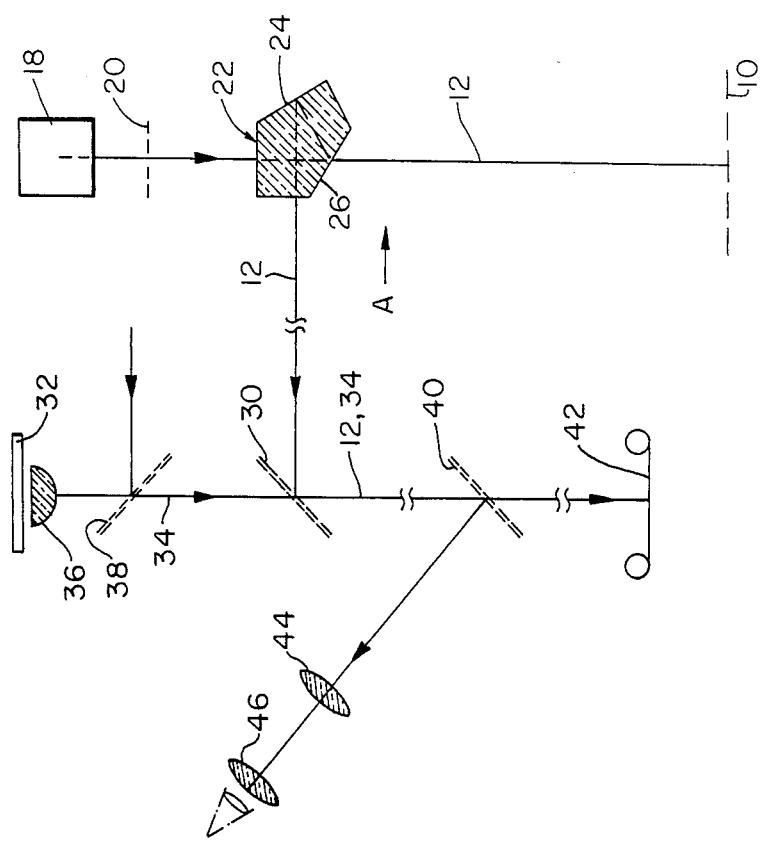
FIG. 3 is a diagrammatic representation of an embodiment of the invention.

This alternative embodiment is shown in FIG. 3 wherein the first deflecting device 47 is a pentagonal prism with two reflecting surfaces. The intermediate image 42 of FIG. 1 and the lens 28 which formed it are dispensed with. The macro-object beam 12, leaving the pentagonal prism 22, then passes through a lens 28 and strikes a semi-transparent, semi-reflective surface 30 for reflecting images, which surface is arranged at right angles to the plane of the path of the beam between the second deflecting device 18 and the lens 28, and which reflects the macro-object beam into the microscope object beam which is directed downwards from the microscopic object 32.

A microscope objective is designated 36 and a partially-transparent mirror, for the incident illumination, is designated 38. The microscope object beam 34 and the macro-object beam 12, which has been deflected through 90° by the surface 30 for reflecting images, then pass through a deflecting device 40 which enables the image to be viewed. In the embodiment shown, this is a semi-transparent mirror. The beams then strike a film plane 42.

A portion of the microscope object beam 34 and of the macro-object beam 12 is deflected by the semi-transparent mirror 40 so that the deflected beams are directed obliquely upwards in a plane which is parallel with the plane of the path of the macro-object beam 12 between the drawing surface and the third deflecting device 22, and on the same side of the plane of the path of the macro-object beam between the second deflecting device 18 and the surface 30 for reflecting images, or the deflecting device 40. In other words, the arrangement shown in FIG. 2 extends, in FIG. 1, out of the plane of the paper, in exactly the same way as the macro-object beam and the microscope object beam extend out of the plane of the paper following their deflection by the deflecting device 40.

The lens 28 produces a second intermediate image of the macro-object, at 43, where the microscope objective also produces an intermediate image of the microscopic object. The plane 43 is then imaged, by a further lens 44, into the viewing plane of the eyepiece 46, which plane is not shown.

The macro-object, or the drawing surface, is apparently rotated three times, through 180°, by the lenses 16, 28 and 44, so that the image of the drawing surface or, as the case may be, of the macro-object, appears, in the eyepiece, as having been turned through 180°. This turning must be compensated, this being effected with the arrangement of the deflecting devices 14, 18, 22, 30 and 40, as described.

The deflecting device 40 can also comprise three reflecting surfaces, but these surfaces must be regarded as having the same effect as one reflecting surface. The deflecting devices 14 and 18 can also comprise more than one reflecting surface, for example, three surfaces, or five surfaces, etc., thereby producing no change in the result. Similar considerations apply in the case of the deflecting device 22 which can comprise two, or four, or six reflecting surfaces, etc. However, it is generally preferable to avoid making the design of the system more complicated than is necessary.

If the formation of an intermediate image 43, of the microscopic object and of the macro-object, is dispensed with, the deflecting device 22 can thus be replaced by one of the deflecting devices 14 and 18.

The deflecting devices 14, 18, 22 and 30 can be fitted on the right-hand side of the microscope, or, for left-handed users, they can be fitted, for example, on the left of the microscope, in a mirror-image arrangement, so that, in both cases, an erect and laterally non-reversed image of the drawing surface is provided in the viewing eyepiece.

The surface 30 for reflecting images can also be opaque, and or be capable of being moved. When surface 30 is rotated 90° and is semi-transparent, semi-reflective, an image of the object is presented to the drafting surface 10. In this case, the system is used as a drawing attachment.

I claim:

1. Drafting macrophotography attachment, for a microscope of the inverted type having an objective and a deflecting device which deflects a downward-directed microscope object beam laterally and upwardly to an eyepiece, thereby permitting an image to be viewed, comprising a removably mounted surface for reflecting images disposed between the microscope objective and the deflecting device, said surface reflecting a drawing surface or a macro-object into the microscope object beam, by means of a first deflecting means which laterally deflects an upwardly-directed beam from a horizontal drawing surface, or from a horizontally lying macro-object, in a plane which is parallel with the plane in which the microscope object beam is deflected; a second deflecting means which further deflects the beam downwards to a third deflecting means, the third deflect means further deflecting the beam at a right angle to the beam between the first and second deflecting means and toward the surface for reflecting images, on of the three deflecting means possessing two reflecting surfaces which produce an inversion of the image, and each of the other two deflecting means possessing a single reflecting surface, or an odd number of reflecting surfaces, means being disposed between the first and second deflecting means to form a single intermediate image of the macro-object, or drawing surface, said intermediate image being formed between the second and third deflecting means.

2. The attachment according to claim 1 in which the deflecting device which produces an inversion of the image is a pentagonal prism with two reflecting surfaces.

3. The macrophotography attachment, according to claim 1 in which each deflecting means deflects the beam through 90°.

4. The attachment, according to claim 1 in which, in the case where a single intermediate iamge of the microscopic object is formed between the obvservation plane and the microscope objective, the third deflecting device possesses two reflecting surfaces which produce an inversion of the image, and the intermediate image of the macro-object, or of the drawing surface is imaged into the intermediate image of the microscopic object.

5. A drafting and macrophotography attachment, for a microscope of the inverted type having an objective and a deflecting device which deflects a downward-directed microscope object beam laterally and upwardly to an eyepiece, thereby permitting an image to be viewed, comprising a removably mounted surface for reflecting images disposed between the microscope objective and the deflecting device, said surface reflecting a drawing surface or a macro-object into the microscope object beam, by means of a first deflecting means which laterally deflects an upwardly-directed beam from a horizontal drawing surface or from a horizontally lying macro-object, in a plane which is parallel with the plane in which the microscope object beam is deflected; a second deflecting means which further deflects the beam downwards to a third deflecting means, the third deflecting means further deflecting the beam, at a right angle to the beam between the first and second deflecting means and toward the surface for reflecting images, the first or second deflecting means possessing two reflecting surfaces.

6. The attachment according to claim 5 wherein the third deflecting means is a pentagonal prism.

7. The attachment according to claim 5 wherein each deflecting means deflects the beam through 90°.

* * * * *